United States Patent [19]
Yuito et al.

[11] Patent Number: 4,881,144
[45] Date of Patent: Nov. 14, 1989

[54] THIN FILM MAGNETIC HEAD

[75] Inventors: Isamu Yuito; Eijin Moriwaki, both of Hachiouji; Kazuo Shiiki, Kanagawa; Yoshihiro Hamakawa, Koganei; Hisashi Takano, Hachiouji, all of Japan

[73] Assignee: Hitachi, Ltd., Tokyo, Japan

[21] Appl. No.: 142,697

[22] Filed: Jan. 11, 1988

[30] Foreign Application Priority Data

Jan. 19, 1987 [JP] Japan .................................... 62-8031

[51] Int. Cl.$^4$ ........................................ G11B 5/16
[52] U.S. Cl. ...................................... 360/125; 360/126
[58] Field of Search ................ 360/123, 124, 125–127, 360/119; 29/603

[56] References Cited

U.S. PATENT DOCUMENTS 4,636,897  1/1987  Nakamura et al. ................. 360/119
4,651,248  3/1987  Shiiki et al. ....................... 360/126 X
4,760,481  7/1988  Yuito et al. ........................ 360/123

OTHER PUBLICATIONS

Fabrication of a Thin Film Head Using Polyimide Resin and Sputtered Ni-Fe Films, *Journal of Applied Physics,* Mar. 1982, pp. 2608–2610.
Fabrication of a Multitrack, Thin-Film Head, *Journal of Applied Physics,* Mar., 1982, pp. 2611–2613.

*Primary Examiner*—John H. Wolff
*Attorney, Agent, or Firm*—Fay, Sharpe, Beall, Fagan, Minich & McKee

[57] ABSTRACT

In a thin film magnetic head of the type wherein a lower magnetic pole, a gap layer, a first insulating layer, a coil, a second insulating layer and an upper magnetic pole are formed sequentially on a substrate, the present invention provides a thin film magnetic head characterized in that a surface active layer made of aluminum oxide, for example, is disposed between the first insulating layer and the second insulating layer except where the coil is formed on the first insulating layer so that the surface active layer is disposed between the coil and the second insulating layer. According to the present invention, it is possible to prevent the occurrence of bubbles between coil conductors, and eventually to improve flatness of the surface of the second insulating layer and to prevent degradation of the characteristics of the upper magnetic pole.

12 Claims, 2 Drawing Sheets

THIN FILM MAGNETIC HEAD

BACKGROUND OF THE INVENTION

This invention relates generally to a magnetic head, particularly a thin film magnetic head, for use in magnetic disks, VTRs (Video Tape Recorders), and so forth. More in particular, the present invention relates to a thin film magnetic head having high performance and high reliability.

A typical conventional thin film magnetic film such as shown in FIG. 2 of the accompanying drawings uses a Ni-Fe alloy film for an upper magnetic pole 19 and a lower magnetic pole 12 which is isolated magnetically from the upper magnetic pole 19, and PIQ (trade name of Hitachi Chemical Co., Ltd.) made of polyimide iosindro-quinazolinedione as a high heat-resistant polymer film material for an insulating layer 21 which electrically isolates both magnetic poles from a coil 16. In this case, PIQ is used as an insulating layer which can withstand the heat when a substrate is heated for forming the Ni-Fe alloy film and can make flat unevenness of the coil. On the other hand, a method of forming a film of the Ni-Fe alloy at a low temperature by a plating method is known. In the thin film magnetic heads of this kind, a photoresist film capable of delicate machining or etching is used as the insulating layer 21 in place of PIQ.

In FIG. 2, reference numerals 11 and 14 represent a substrate and a gap layer, respectively.

The thin film magnetic head using PIQ for the insulating layer is disclosed, for example, in "M. Hanazono et al; J. Appl. Phys., Vol. 53, No. 3, March 1982, pp. 2608–2610". A thin film magnetic head wherein a two-layered coil is covered with PIQ is described, for example, in "Y. Noro et al; J. Appl. Phys., Vol. 53, No. 3, March 1982, pp. 2611–2613".

In order to improve performance of the thin film magnetic head, that is, to improve its S/N ratio, resistance of the coil 16 must be reduced. Accordingly, attempts have been made to increase the sectional area of a conductor. On the other hand, the length of a magnetic path on which the coil is wound is preferably as short as possible. To satisfy these requirements, it has been a customary practice to wind the coil in a multi-layered arrangement. In the thin film magnetic head described above, the coil 16 has the two-layered structure. In this example, the first layer is 9 turns while the second layer is 8 turns to wind a conductor which is 6 $\mu$m wide, 3 $\mu$m gap and 2 $\mu$m high in 17 turns. From the process aspect, however, the number of production steps increases. Therefore, attempts have also been made to wind the coil in a high density and to increase the height by reducing the width and the gap in order to reduce the resistance. If the coil described above is changed from the two-layered structure to the single-layered structure without changing the resistance, for example, the width, gap and height of the coil conductor become approximately 3~3.5 $\mu$m, 2 $\mu$m and 3.5 $\mu$m, respectively.

In the thin film magnetic head, an electric and magnetic insulating layer 21 is formed on the coil 16. This insulating layer 21 serves also for making uniform the unevenness due to the coil and for preventing degradation of the characteristics of the upper magnetic pole 19. Both afore-mentioned PIQ and photoresist are employed because they are polymer resins having high fluidity and can easily make flat unevenness due to the coil by spin coating. However, no consideration is made to the method of forming the insulating layer in the case where the coil gap becomes small but its height is great. Therefore, in accordance with the conventional spin coating method alone, bubbles 31 develop between the coil conductors as shown in FIG. 3 and sufficient flatness cannot be obtained easily. Since conventional wirings for a semiconductor device do not require such a wiring having a small gap but a large height, this problem is inherent to the wiring of the thin film magnetic head. Furthermore, unless the upper surface of the insulating layer is made sufficiently flat, the characteristics of the upper magnetic pole formed on the insulating layer get deteriorated. If bubbles occur, they exert adverse influences on flatness and reliability, as well.

Incidentally, reference numeral 32 in FIG. 3 represents an underlying substrate.

SUMMARY OF THE INVENTION

It is therefore an object of the present invention to provide a thin film magnetic head which eliminates the problems of the prior art technique described above and has an insulating layer which buries completely narrow gaps between wirings and has sufficiently high flatness. In other words, the present invention is directed to provide an improved thin film magnetic head including a wiring whose gap is small but whose height is great.

In a thin film magnetic head including a lower magnetic pole formed on a substrate, a gap layer, a first insulating layer formed on the gap layer, a coil formed on the first insulating layer, a second insulating layer formed on the first insulating layer and on the coil and an upper magnetic pole, the object of the invention described above is accomplished by forming a surface active layer that is sequentially contiguous to both the coil and the first insulating layer on one side of the surface active layer and contiguous to the second insulating layer on its other side.

The reasons why bubbles develop between coil conductors or the reasons why the insulating layer cannot come easily and smoothly between the coil conductors are (1) high viscosity of the polymer resin as the insulating layer and (2) low wettability of the polymer resin to the underlayer. The problem (1) can be solved by use of a polymer resin having a low viscosity. However, this method will not be sufficient if the gap between the coil conductors becomes small and the height becomes great. When a polymer resin having a low viscosity is used, the film thickness per spin coating becomes small and spin coating must be carried out several times in order to form the insulating layer having a predetermined thickness. For this reason, the problem (2) must be solved. In other words, in order to accomplish the object of the present invention described above, it is essentially necessary to improve wettability of the polymer resin formed on the coil with respect to the coil and to the under-layer film on which the coil is formed. To accomplish this object, the present invention forms the surface active layer described above.

The surface active layer is at least 30 Å thick and preferably at least 50 Å thick. If the thickness is below 30 Å, the effect of improving the surface active layer is not sufficiently high undesirably. Moreover, the thickness of the surface active layer must be such that it does not become a barrier when the second and first insulating layers are shaped continuously by etching. If the surface active layer is above about 100 Å in the case of wet etching, it sometimes becomes a barrier. In the case of physical etching such as ion milling, the surface active layer does not become a barrier even if it is very thick and hence, there is no upper limit to the thickness. However, the thickness is preferably within the range in which the fabrication process is easily performed.

Any materials can be used for the surface active layer so long as they can improve wettability. An example of a suitable material is an insulating aluminum compound such as aluminum oxide. The surface active layer of aluminum oxide is formed, for example, by the following two methods. (1) A liquid aluminum chelate is coated by, for example, spin coating on the first insulating layer and on the coil and heat-treated at 350° C., for example, in the atmosphere. (In this case, the kind of aluminum chelate is not particularly limitative.) (2) Alumina is sputtered in a 1:1 mixture of argon and oxygen. These forming methods (1) and (2) of the aluminum oxide film are known in the art.

FIGS. 4a to 4c are schematic sectional views showing the principal portions of the thin film magnetic head of the present invention during its fabrication process.

FIG. 4a shows the coil 16 formed on the base film 32. The surface active layer 17 is formed on the coil 16 and the underlayer film 32 as shown in FIG. 4b. Next, the polymer resin layer 21 is formed in order to eliminate unevenness of the coil 16, as shown in FIG. 4c. Here, the surface active layer 17 formed on the coil 16 and the underlayer film 32 is directed to improve wettability of the polymer resin layer 21 with respect to the coil 16 and the underlayer film 32. Since such a surface active layer 17 is formed, the polymer resin 21 can easily enter the narrow portions between the conductors of the coil 16 and can eliminate the occurrence of bubbles 31. As a result, it is possible to secure flatness of the polymer resin layer 21 and to prevent degradation of the characteristics of the magnetic film to be formed on the polymer resin layer 21.

The same structure as that of the conventional thin film magnetic heads may be used for the thin film magnetic head of the present invention except that the surface active layer is inserted between the first and second insulating layers except where the coil is formed on the first insulating layer so that the surface active layer is inserted between the coil and the second insulating layer.

DESCRIPTION OF THE PREFERRED EMBODIMENTS

Figure 1A:
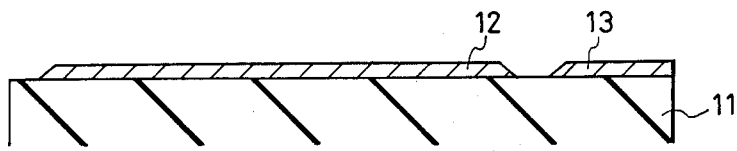
FIGS. 1a to 1g are sectional views showing stepwise the fabrication steps for fabricating the thin film magnetic head in accordance with one embodiment of the present invention.
Figure 1B:
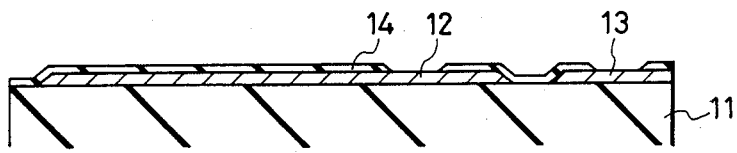
Figure 1C:
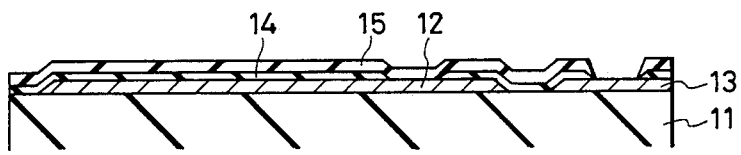
Figure 1D:
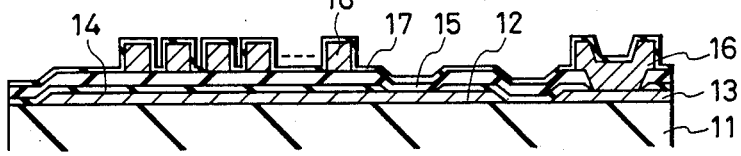
Figure 1E:
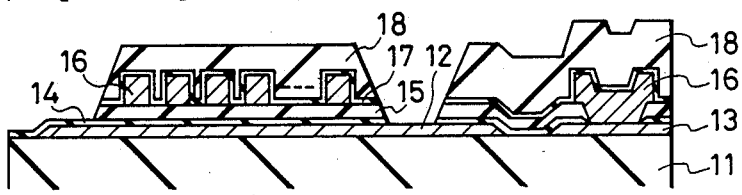
Figure 1F:
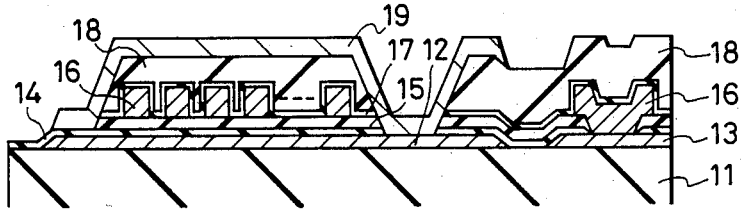

Embodiment 1:

FIGS. 1a to 1g show the fabrication steps followed in fabricating the thin film magnetic head in this embodiment.

Hereinafter, this embodiment will be described stepwise wherein symbols (a) to (g) correspond to the steps of FIGS. 1a to 1g, respectively.

(a) A lower magnetic pole 12 and a lead wire 13 are formed on a non-magnetic substrate 11. $Al_2O_3 \cdot TiC$ is used as the non-magnetic substrate 11. The lower magnetic pole 12 and the lead wire 13 are made of known Ni-Fe alloy (e.g. 78 wt % Ni-Fe alloy) and are deposited simultaneously by sputtering. Patterning of these components is made by ion milling using a photoresist film as a mask. The film is 1.0 $\mu m$ thick.

(b) A gap layer 14 is then formed. It is made of $Al_2O_3$ and formed by sputtering. The film is 0.4 $\mu m$ thick. After the film is formed, a contact throughhole between the lower and upper magnetic poles 12, 19 and a contact through-hole between a coil 16 and the lead wire 13 are shaped. The through-holes are shaped by ion milling using the photoresist film as the mask in the same way as in the step (a).

(c) A first insulating layer 15 is formed on the gap layer 14. The first insulating layer 15 is disposed in order to make flat the step by the lower magnetic pole 12 and the lead wire 13 and to improve electric insulation between the lower magnetic pole 12 and the coil 16. Here, PIQ having high flatness is used as the first insulating layer 15. It is 2 $\mu m$ thick. To pattern the through-hole on the lead wire 13, a mask using an OMR resist (a trade name of Tokyo Oka K.K.) is used as a photoresist material and a mixed solution of hydrazine and ethylene diamine is used as an etching solution for etching.

(d) The coil 16 is formed by lift-off process. The coil 16 consists of a composite film formed by sequentially laminating Cr, Cu and Cr on the first insulating layer 15 in order named. Their film thickness is 0.05, 3.5 and 0.05 $\mu m$, respectively. The width and gap of the coil conductors are 3 $\mu m$ and 2 $\mu m$, respectively.

A surface active layer 17 is shaped after the coil 16 is formed. This surface active layer 17 is disposed in order to improve wettability between a second insulating layer 18, which will be described at the next step (e), and the coil 16 and to completely bury the gaps between the coil conductors by the second insulating layer 18. Therefore, surface active layer 17 is sequentially contiguous on its one side with both first insulating layer 15 and coil 16, and on its other side contiguous with second insulating layer 18. An aluminum oxide layer is used as the surface active layer. This Al oxide layer is formed by Al chelate treatment. As is well known in the art, the Al chelate treatment is carried out by spin coating a liquid Al chelate and then heat-treating it at 350° C. in the atmosphere to form the Al oxide layer. The thickness of this Al oxide layer is in order of nm but does not prove to be a barrier layer at the time of etching the first etching layer 15 after the etching of the second insulating layer 18 to be formed in the next step (e).

(e) The second insulating layer 18 is formed on the surface active layer 17. PIQ is used for the second insulating layer 18 in the same way as the first insulating layer 15. The second insulating layer is 6 $\mu m$ thick. Patterning of the second insulating layer 18 and that of the first insulating layer 15 are carried out successively. Patterning is made by wet etching using the OMR resist layer as the mask.

(f) An upper magnetic pole 19 is formed. The upper magnetic pole 19 is made of the Ni-Fe alloy film in the same way as the lower magnetic pole 12 and is 1.5 $\mu m$ thick. This film is formed by sputtering and its patterning, by ion milling.

Figure 1G:
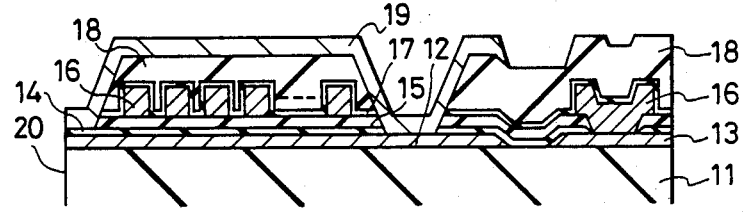
Figure 2:
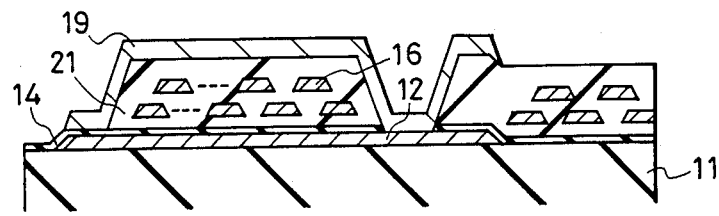
FIG. 2 is a sectional view showing an example of a conventional thin film magnetic head.
Figure 3:
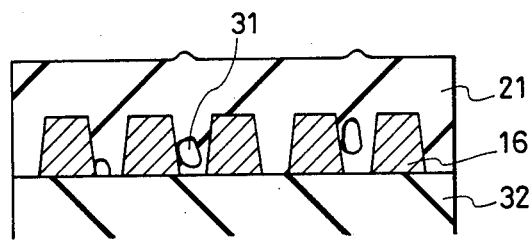
FIG. 3 is a sectional view showing an unpreferred portion of the conventional thin film magnetic head.
Figure 4A:
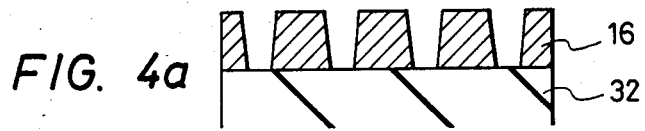
FIGS. 4a to 4c are schematic sectional views useful for explaining principal fabrication steps for fabricating the thin film magnetic head in accordance with the present invention.
Figure 4B:
Figure 4C:
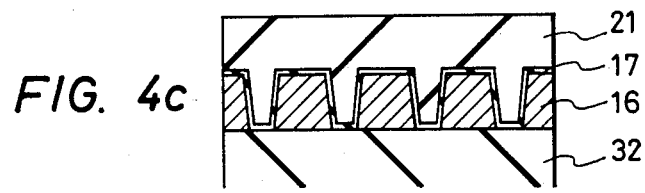

(g) A surface 20 facing a magnetic recording medium is formed by machining. There is thus completed the thin film magnetic head of this embodiment as shown in FIG. 1g. A protective film made of alumina, for example, is deposited on the upper magnetic pole 19 and the second insulating layer 18 of the thin film magnetic head shown in FIG. 1g, whenever necessary.

In accordance with this embodiment, the surface active layer 17 is formed on the first insulating layer 15 and on the coil 16 and the narrow gaps between the coil conductors can be buried completely by the second insulating layer 18. Incidentally, in almost all the conventional thin film magnetic heads not using the surface active layer, bubbles develop between the coil conductors.

Embodiment 2:

In the thin film magnetic head in Embodiment 1 described above, the Al oxide is used as the surface active layer 17 and the Al oxide layer is formed by Al chelate treatment. In this second embodiment, on the other hand, the Al oxide layer is formed by known sputtering using $Al_2O_3$ as a target. The Al oxide layer is 5 nm thick.

The second insulating layer 18 devoid of any bubbles can be formed in the same way as in Embodiment 1 when the Al oxide layer formed by sputtering is used as the surface active layer 17, too.

Embodiment 3:

Various materials other than the Al oxides can be used as materials for improving wettability. This embodiment uses an aminosilane system solvent. The aminosilane system surface active material consists of Si, N, C and H as its principal elements. In this embodiment, C and N are primarily formed on the coil 16 and on the first insulating layer 15 and improve wettability with PIQ.

In this embodiment, the surface active layer 17 is formed by spin coating the aminosilane system solvent and then heat-treating it at 90° C. for 20 minutes.

After the second insulating layer 18 is formed, no bubbles are observed at all in the same way as in the case of the Al oxide layer.

As can be understood clearly from the foregoing embodiments, the present invention can completely bury the gaps between the coil conductors by the insulating layer 18 due to the effect of the surface active layer and can remarkably reduce the occurrence of bubbles. According to the studies made by the inventors of the present invention, bubbles are observed occuring 100% when the surface active layer is not formed. In contrast, when the surface active layer is formed in accordance with the present invention, the occurrence of bubbles can be eliminated substantially. In the conventional thin film magnetic heads, there is the problem in that flatness of the surface of the insulating layer is as great as about 0.3 $\mu$m on the bubble portion, but the present invention can limit flatness below 0.1 $\mu$m and can prevent degradation of the upper magnetic pole.

In the drawings, like reference numerals are used to identify like constituents.

Although the invention has thus been described in its preferred forms, it is not particularly limited thereto and various changes or modifications can be made by those skilled in the art without departing from the scope and spirit thereof.

What is claimed is:

1. In a thin film magnetic head including a lower magnetic pole formed on a substrate, a gap layer, a first, insulating layer, a coil formed on said first insulating layer, a second insulating layer formed on said first insulating layer and on said coil, and an upper magnetic pole, the improvement wherein a surface active layer is formed having opposite sides wherein one side is sequentially contiguous to both said first insulating layer and said coil and the other side of said surface active layer is contiguous to said second insulating layer.

2. A thin film magnetic head according to claim 1, wherein said surface active layer is made of an insulating aluminum compound.

3. A thin film magnetic head according to claim 2, wherein said surface active layer is at least 30 Å thick.

4. A thin film magnetic head according to claim 1, wherein said surface active layer is made of aluminum oxide.

5. A thin film magnetic head according to claim 4 wherein said surface active layer is at least 30 Å thick.

6. A thin film magnetic head according to claim 4 wherein said aluminum oxide is formed by aluminum chelate treatment.

7. A thin film magnetic head according to claim 4 wherein said aluminum oxide is formed by sputtering.

8. A thin film magnetic head according to claim 4 wherein said first and second insulating layer are made of polyimide isoindro-quinazolinedione.

9. A thin film magnetic head according to claim 4 wherein said first and second insulating layers are made of a polymer resin.

10. A thin film magnetic head according to claim 1 wherein said surface active layer is at least 30 Å thick.

11. A thin film magnetic head according to claim 1 wherein said first and second insulating layers are made of polyimide isoindro-quinazolinedione.

12. A thin film magnetic head according to claim 1 wherein said first and second insulating layers are made of a polymer resin.

* * * * *